United States Patent [19]
Townsend, Jr. et al.

[11] 3,909,048
[45] Sept. 30, 1975

[54] END FITTING FOR FLEXIBLE PUMPING STRAND

[75] Inventors: Herbert E. Townsend, Jr., Coopersburg; Frank Krcmar, Easton, both of Pa.

[73] Assignee: Bethlehem Steel Corporation, Bethlehem, Pa.

[22] Filed: Apr. 3, 1974

[21] Appl. No.: 457,527

[52] U.S. Cl. .............. 285/169; 21/2.5 R; 21/2.7 R; 21/61; 137/539; 166/310; 285/14; 285/382; 403/284

[51] Int. Cl.² ..................... C23F 11/00; F16L 13/14

[58] Field of Search ............ 285/133 A, 133 R, 132, 285/382, 169; 403/284; 166/310; 21/2.5 R, 2.7 R, 61; 174/2.5 R, 24; 138/148

[56] References Cited
UNITED STATES PATENTS

| | | | |
|---|---|---|---|
| 916,136 | 3/1909 | Ford | 285/133 R |
| 1,736,923 | 11/1929 | Lalonde | 285/133 R |
| 1,896,250 | 2/1933 | Scott | 285/133 A X |
| 1,981,863 | 11/1934 | Harris | 285/133 A |
| 2,703,585 | 3/1955 | Coberly | 285/133 A X |
| 3,471,904 | 10/1969 | Aho | 403/284 X |
| 3,637,341 | 1/1972 | Horton et al. | 166/310 X |

*Primary Examiner*—Thomas F. Callaghan
*Attorney, Agent, or Firm*—Joseph J. O'Keefe; Charles A. Wilkinson

[57] ABSTRACT

A down-hole compression type fitting for use in oil wells on the end of flexible pumping strand having an outer plastic jacket and through which a fluid is designed to pass is provided with a by-pass arrangement around the compressed portion of the fitting to conduct the fluid from the inside of the cable to the lower end of the fitting and either into the surrounding oil well or into a further fitting or apparatus in the bottom of the well.

5 Claims, 8 Drawing Figures

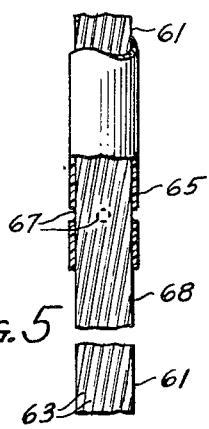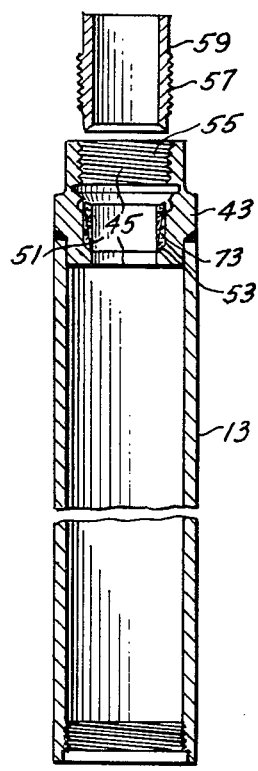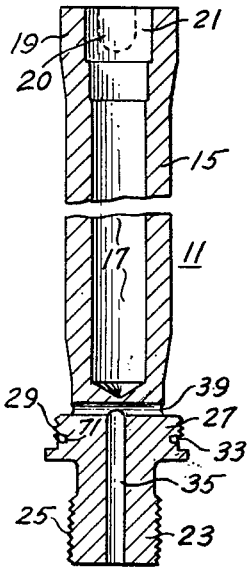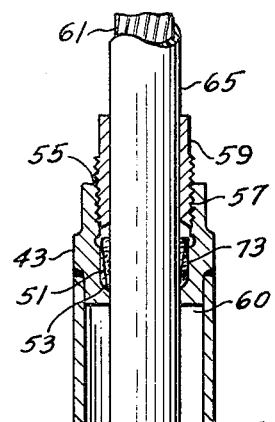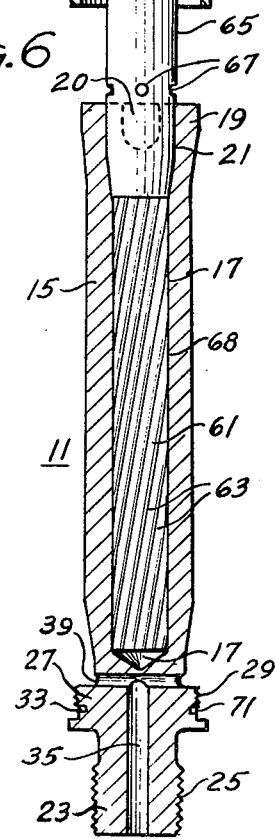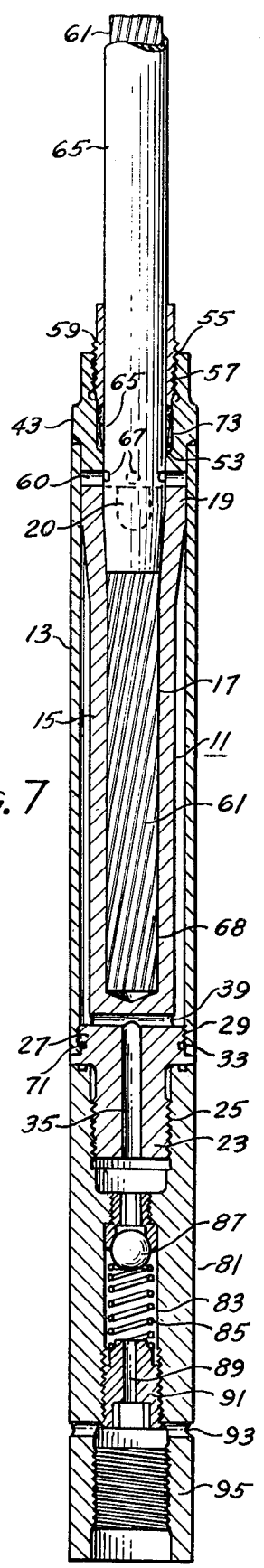

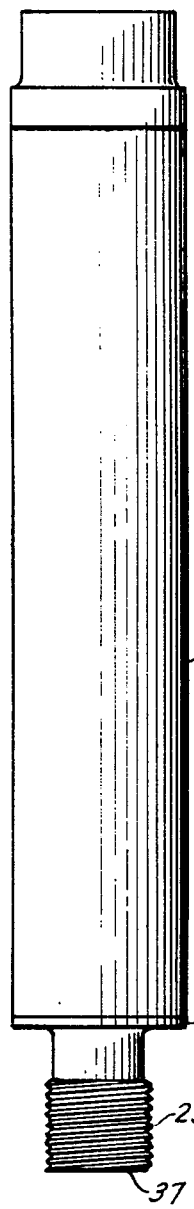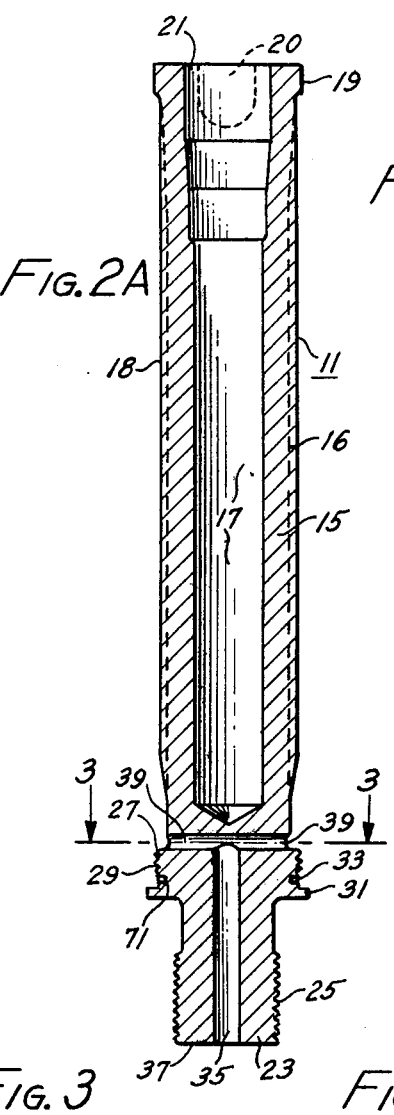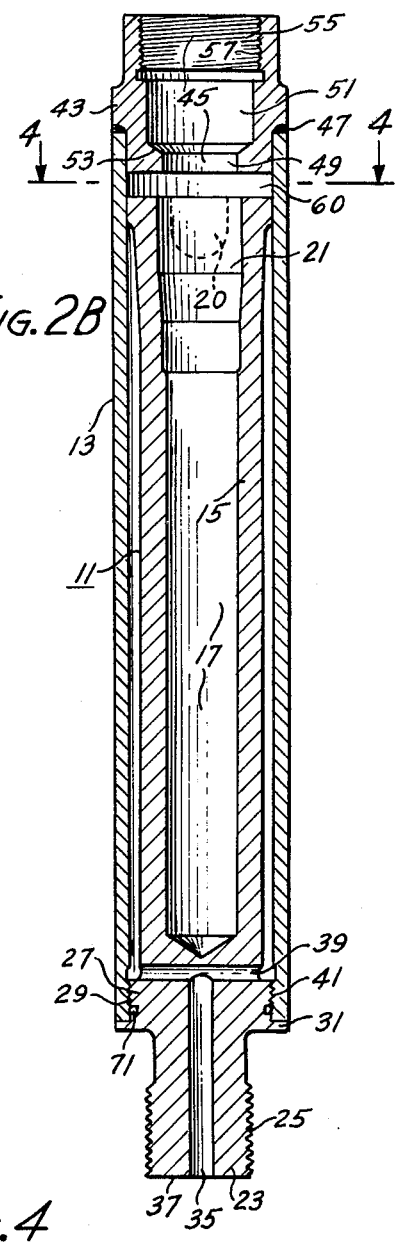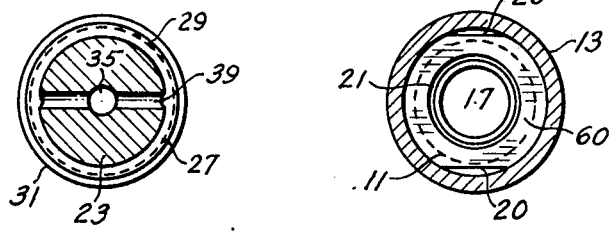

END FITTING FOR FLEXIBLE PUMPING STRAND

BACKGROUND OF THE INVENTION

This invention relates to oil well pumping and especially to pumping with flexible pumping strand and more particularly to end fittings useful with flexible pumping strand.

U.S. Pat. No. 3,637,341 issued Jan. 25, 1972 to Horton et al. and assigned to the assignee of the present invention discloses a corrosion protection system for flexible pumping strand used in oil wells. In accordance with that invention a flexible pumping strand is provided with a flexible outer jacket which isolates the wires of the strand from the surrounding environment and also encloses a corrosion inhibiting fluid within the strand. In accordance with the preferred operation of this prior invention the corrosion inhibiting fluid is passed slowly through the strand so that the inhibitor is continuously renewed in order to overcome the inhibitor exhausting effects of any corrosive substances which may gain access through the strand jacket to the interior of the pumping strand either through a slight permeability of the jacket over long periods or through defects in the jacket. In order to provide a steady flow of inhibitor through the entire cable either continuously or intermittently it is necessary to have an opening of some form in the lower end of the cable jacket for escape of the exhausted inhibitor fluid. Even in cables in which the flow may be so intermittent as to be negligible or even in which there is no flow at all, but only a static inhibitor solution held in a flexible pumping strand, it is still necessary to provide a significant opening in the form of a pressure valve near the bottom of the strand in order to quickly exhaust the inhibitor solution or fluid from the cable in case a gas blow out or breakdown of the pumping cycle should suddenly fill the well tubing with gas at a lower pressure than the normal underground environment. In such case, since the pumping strand is filled with a liquid having a specific gravity similar to the specific gravity of the normally surrounding corrosive environment in order to prevent ballooning of the plastic jacket during normal operation, if the supporting pressure of the surrounding environment is suddenly relieved by the formation of a gas pocket in the well and/or well tubing the weight of the corrosion inhibitor in the cable will under such circumstances cause sudden ballooning and probable rupture of the plastic jacket near the bottom of cable unless the column of liquid within the cable is quickly dumped from the cable. In order to dump the column of liquid from the cable quickly enough to prevent ballooning or rupture of the cable there must be available a high capacity liquid passage means from the interior to the exterior of the cable. Such a liquid passage means will either be in the form of one large capacity valve at the bottom of the cable or a series of smaller valves spaced along the cable. It is clearly inconvenient, if not impractical or impossible, to provide a number of valves along the cable because of clearance problems and the like and also because of the difficulty in securing a seal with such a valve along the plastic outer jacket portions of the cable. While it is possible to place an orifice or valve near the lower end of the cable just above the end fitting as broadly illustrated in U.S. Pat. No. 3,637,341, it is highly desirable that the orifice or valve be located at the lower end of the terminal fitting itself. It is desirable, however, that the end or terminal fitting for a plastic jacketed pumping strand be a compression type end fitting such as shown and described in U.S. Pat. No. 3,471,904 issued Oct. 14, 1969 to T. Aho, assignor to the assignee of the present invention. (The Aho compression fitting is illustrated in connection with a different form of flexible pumping strand.) The use of a compression fitting on the end of the flexible pumping strand, however, results in the component wires of the strand being compressed so that little if any fluid could pass between the wires. Compression of the fitting during application to the strand would also serve to collapse or at the least seriously restrict any orifices formed in the walls of the compression fitting which might be provided to pass liquid through the fitting. It has been a problem heretofore, therefore, to facilitate the passage of liquid and particularly corrosion inhibiting liquids past the end of flexible pumping strand either to a valve or to some other apparatus on the end of the strand such as the pumping mechanism itself.

By-pass fittings per se have not been completely unknown in the prior art even in the oil well pumping art. For example, U.S. Pat. No. 2,445,249 to C. W. Sproull discloses a coupling for oil well pump tubing which incorporates a by-pass type passage through the coupling to facilitate the passage of gas from the lower portions of the well up through small diameter tubing secured within the larger well tubing. An elbow at each end of the tubing conducts the gas to the exterior threaded surface of the tubing where it opens into a first lower annular depression in the threaded surface of a coupling. A longitudinal passage in the coupling, which, as shown in the drawing of the patent, may comprise a longitudinal groove cut into the surface of the coupling covered with a plate welded to the outer surface of the coupling, serves then to conduct the gas through the coupling and into a second upper annular groove or depression in the coupling which is alinged with an opening in an upper section of well tubing into a small interior gas conducting tubing within the well tubing. The purpose of the "by-pass" in the Sproull coupling is not to conduct the gas past the coupling, since the interior tubing could perfectly well be extended through the coupling as well as the tubing, but instead serves to facilitate the use of a single coupling operation for connecting or disconnecting adjacent sections of well tubing. The Sproull coupling is, of course, not adapted for use as an end fitting on a flexible pumping strand where there is encountered a serious problem in compressing the fitting on the strand and subsequently conducting fluid past the fitting without significantly enlarging the diameter of the fitting.

SUMMARY OF THE INVENTION

The foregoing difficulties and problems associated with the use of compression type end fittings on flexible pumping strand have now been obviated by the use of an end fitting designed and constructed in accordance with the present invention. The end fitting of the invention comprises essentially a central compression fitting for compression upon the end of the cable and having passage means in the lower end of the fitting leading from the exterior surface of the central portions of the fitting to the lower end of the fitting. A shroud or sleeve is provided on the outside of the central compression portion of the fitting. The shroud or sleeve is secured to the surface of the cable at the upper end of the fitting to effect a seal with the jacket of the cable and the lower end of the shroud or sleeve is secured to the lower end of the central portion of the fitting below the fluid passages opening to the surface of the fitting. An orifice in the plastic jacket of the cable between the upper seal and the upper end of the compression portion of the fitting serves to allow a flow of corrosion inhibiting fluid from the interior of the strand to the annulus between the shroud and the central compression portion of the fitting. The annulus has a cross sectional area large enough to conduct a large amount of fluid past the compression fitting and to the lower orifices in the fitting without significantly increasing the diameter of the fitting.

BRIEF DESCRIPTION OF THE DRAWINGS

FIG. 1 is an exterior view of the end fitting of the present invention illustrating the compact design of the fitting.

FIG. 2A is a longitudinal sectional view of the central compression portion of the end fitting of the invention prior to compression on the end of a pumping strand.

FIG. 2B is a longitudinal cross-section of the entire end fitting of the invention in assembled condition.

FIG. 3 is a transverse cross section of the fitting shown in FIG. 2A along the line 3—3.

FIG. 4 is a transverse cross-section of the fitting shown in FIG. 2B along the line 4—4.

FIG. 5 is a reduced scale longitudinal cross-section of the end fitting of the invention disassembled and ready to be mounted on the end of a cable.

FIG. 6 is a reduced scale longitudinal cross-section of the end fitting of the invention partially assembled on the end of the strand and ready for swaging of the end fitting to the strand.

FIG. 7 is reduced scale longitudinal cross-section of the final assembly of the end fitting on the strand and includes a valve assembly screwed to the end.

DESCRIPTION OF THE PREFERRED EMBODIMENT

As shown in FIGS. 1 through 4 the end fitting of the present invention is comprised of two principal portions, a central compression portion 11 and an annular outer sleeve or shroud section 13. The central compression portion of the fitting comprises a compression fitting having annular walls 15 surrounding a central bore 17. The bore 17 has a generally uniform diameter over most of its length designed to easily slip over the end of a strand upon which the fitting is to be swaged or otherwise compressed, but having a snug enough fit so that excessive compression and compaction of the side walls of the fitting is not necessary to attain a secure grip of the fitting upon the strand. An outline of the wall of the compression fitting subsequent to compression upon a flexible pumping strand is shown in dotted outline 16 inside the outline of the surface 18 of the fitting prior to compression. The inner or strand end of the compression fitting has an annular flange 19 which has two flats 20 ground out upon its outer surface. The central bore of the fitting has an enlargement 21 decreasing in size in steps away from the end of the fitting.

The opposite or outer end of the fitting has an attachment nose 23 with external threads 25 designed to thread into the orifice of down hole well equipment of various types. The nose 23 of the fitting extends from a flange portion 27 which is provided with external threads 29 and a low flange 31 preferably with an annular packing depression 33 positioned between the threads 29 and flange 31. A cylindrical passage 35 extends from the outer face 37 of the nose 23 of the fitting to a point beyond the threads 29 where it is connected to the outer circumferential surface of the fitting by a passage constituted by bore 39 the ends of which open onto the annular surface of the compression portion at a position spaced inwardly of the threads 29 with respect to the longitudinal axis of the fitting.

The annular outer sleeve or shroud 13 of the fitting has an inside diameter only slightly greater than the diameter of flange 19 on the central compression portion 11 of the fitting and is designed to rest in operation in substantial circumferential contact with the flange 19 except in the area of the flats 20 on flange 19. In place of the flats 20 the flange 19 may be provided with any suitable depressions or passages which will serve as access or fluid passages from one side of the flange to the other when the shroud 13 is in operative position. The lower or outer end of the shroud or sleeve 13 is provided on its internal surface with threads 41 which match threads 29 on flange 27 of compression portion 11 and serve in operative position to secure the compression portion and the shroud together. A sealing fitting 43 having a tri-diameter internal bore 45 is secured in some suitable manner such as by welds 47 to the upper or inner end of the shroud 13. The smallest diameter 49 of the bore 45 is approximately the same diameter as the uncompressed diameter of the bore 17 of the central compression portion of the fitting. The middle diameter 51 of the bore 45 is larger than the smaller inner bore and designed to accommodate a packing material against a shoulder 53. The larger diameter 55 of bore 45 is provided with internal threads 57 designed to accommodate a packing gland 59 (see FIGS. 5 through 7).

When the threaded end of the shroud 13 is screwed onto the external threads 29 on the flange 27 until the lower end of the shroud abuts the low exterior flange 31 on the flange 27 there is sufficient clearance between the upper end of the central compression portion of the fitting at flange 19 and the inner portion of the sealing fitting 43 to form a substantial chamber 60 between the two sections. As will explained below, this chamber serves to collect fluid which issues from an orifice in the jacket of the cable and the chamber should preferably be extensive enough so that alignment of the chamber and the orifice is facilitated.

FIGS. 5 through 7 illustrate the assembly of the end fitting upon the down-hole end of a flexible pumping strand. In FIG. 5 the disassembled parts of the fitting are shown in position to be placed over the end of the strand 61. The strand 61 which is formed of a series of steel wires 63 having a fairly long helix or lay has an outer plastic jacket 65 of nylon or other suitable plastic which serves as a flexible barrier or wall between the internal and exterior environments of the cable or strand. A portion of the plastic jacket 65 is initially removed from the end of the strand leaving sufficient plastic to extend into and preferably to the end of the enlargement 21 in the bore 17 when the end of the cable is inserted into the bore 17. An opening or orifice 67 or preferably several orifices 67 are made in the plastic jacket 65 at a distance from the end of the strand which will bring the orifice into line with the chamber 60 between the flange 19 and sealing fitting 43 when the two sections are fitted together.

It is convenient in order to assure correct alignment of the various parts of the fitting with the bore or unjacketed position 68 of the strand 61 and the orifices 67 in the jacket of the strand to roughly assemble the parts of the fitting together over the end of the strand in order to determine the correct length of the unjacketed cable end and the proper placement of the orifices 67.

A packing ring 71 is provided to fit into the packing depression 33. Likewise several packing rings 73, preferably formed of nylon and preferably having interfitting beveled or wedge shaped cross-sections which serve to provide a jam fit of the rings against the plastic jacket 65 of the strand 61, are provided for placement in the central or middle diameter 51 of the bore 45 of sealing fitting 43. The packing gland 59 serves to compress the packing rings 73 against the shoulder 53 of the middle diameter 51 of bore 45.

The bare or unjacketed portion 68 of the strand 61 should extend to the bottom of the central bore 17 of the compression portion 11 of the fitting while, as indicated above, the terminal portion of the jacketing should extend only to the lower end or near the lower end of the enlargement 21 in the bore 17.

Following the preparation of the various parts of the fitting and the removal of the plastic jacket over the end of the strand, the packing gland 59 and packing rings 73 are inserted into the bore 45 of sealing fitting 43 and the packing gland 59 is loosely screwed into place. The entire outer sleeve assembly 75 is then slid over the end of the strand as shown in FIG. 6 temporarily up onto the jacketed portion of the strand. The central compression portion of the fitting is then placed over the unjacketed end 68 of the strand 61 again as shown in FIG. 6. The compression portion of the fitting is compressed or compacted by a suitable swagging apparatus or a compression die apparatus such as a pneumatic press or the like, all as well known in the art of compression fittings, down onto and about the unjacketed end of the strand. The compression fitting is compressed sufficiently to securely and permanently clamp the fitting onto the end of the strand. The upper portion of the fitting over the lower portion of the enlargement 21 of the central bore 17 of the fitting is also compressed down about the lower end of the plastic jacket on the strand. Because of the emlargement 21 in the bore 17 the compression in this section of the fitting is sufficient to provide a good seal with the plastic jacket, but is not sufficient to damage the plastic or extrude the plastic from within the compression fitting. Since the enlargement 21 is stepped or decreases in size towards the interior of the fitting there is a progressively tighter compaction of the fitting against the jacket towards the end of the jacket.

After compression of the annular walls 15 of the central compression portion 11 of the fitting upon the end of the strand 61 is accomplished the annular outer sleeve 13, together with the sealing fitting 43 which is welded to one end of the sleeve, and the loosely fitting packing gland 59, are slid down along the strand and the threaded lower end of the annular outer sleeve 13 is engaged with and threaded over the threads 39 on flange 27 of the central compression portion 11 of the fitting until a seal is attained with the packing in the packing depression 33 on flange 27. The packing gland 59 is then tightened in larger bore 55 of the sealing fitting 43 by rotation into tight engagement with the threads 57 of the fitting until the packing 73 under the gland in the smaller bores of the fitting is securely compressed against the pumping strand surface. The end fitting is then ready for use. Any type of specialized down-hole well apparatus may be threaded over the external threads 25 on the nose 23 of the fitting or the fitting may be used by itself as an attachment to a down-hole pump or the like. One desirable type of apparatus which may be attached directly to the fitting is a preset pressure valve such as is shown in an application entitled "Means for Preventing Damage to Jacketed Flexible Pumping Strand" which is being filed concurrently herewith in the names of Herbert E. Townsend and James B. Horton. Such a preset pressure valve is shown at the bottom of the fitting of the invention in FIG. 7. Briefly the preset pressure valve comprises a body 81 having a bore 83 in which there is contained an adjustable spring 85 and ball valve 87 assembly which serves to adjust the pressure at which fluid may pass by the ball valve, through the central bore 83, through a passage 89 in an adjustably threaded fitting 91 in the end of the bore 83 and out lateral orifices 93 to the exterior of the valve. A female threaded portion 95 at the bottom of the pressure valve serves to connect to some further well apparatus such as a shear release fitting or the pony rod or pump rod of an oil well pump, not shown.

In operation of the end fitting of the present invention, a corrosion inhibiting fluid or the like is passed into the top of the flexible pumping strand 61 and passes down through the strand 61 between the wires 63 and inside the plastic jacket 65 of the strand until it comes to the compressed portion of the fitting as described and illustrated in U.S. Pat. No. 3,637,341 to Horton et al. The fluid will then pass from the interior of the strand through orifices 67 in the plastic jacket 65 of the strand 61 and will enter the chamber 60 in the end fitting under the sealing fitting 43. The fluid will then pass from the chamber 60 past the flats 20 on flange 19, or other suitable passages in flange 19, into the annular space between the annular outer sleeve or shroud 13 and the annular wall 15 of the central compression portion 11 of the fitting. The fluid passes through this annular space and then into the orifices 39 to the cylindrical passage 35 in the nose 23 of the fitting which passage 35 conducts the fluid to the end of the nose 23 where it is discharged into other apparatus or into the well.

It will be seen that the arrangement of the end fitting of the present invention very effectively allows the passage of large quantities of corrosion inhibiting fluid or similar fluid from the interior of the strand past the compression fitting to other apparatus connected to the compression fitting while at the same time maintaining the diameter of the fitting at a minimum value. The assembled fitting not only has a small diameter very suitable for use in the restricted confines of well tubing; but also has a smooth external surface which is very desirable for use in down-hole environments. The use of the annular passage under the shroud to conduct fluid past the compression portions of the end fitting allows a very large amount of fluid to be conducted while at the same time increasing the diameter of the fitting only slightly. The construction of the fitting of the invention is thus very effective to transport large amounts of fluid past the constricted end of the strand both quickly and effectively in a minimum diameter fitting. The threaded construction of the end fitting whereby the sleeve or shroud 13 may be unscrewed from the external threads 29 of flange 27 near the nose of the fitting allows the fitting once it is assembled to be disassembled for inspection and repair or cleaning. Thus it will sometimes occur that during operation it will be desired to pull the apparatus from the well and inspect the fitting to see that all passageways are clear, to make sure that an adequate orifice has been provided in the plastic jacket into the chamber 60 and for other reasons and it may also be desired to change the packing in the fitting under the packing gland 59, which operation is considerably facilitated if access to the packing can be had from the bottom inside the sleeve as well as from the top, since such packing often becomes jammed very securely in the sealing fitting 43. If desired for some reason, however, the sleeve 13 can be welded to the flange 27 at the bottom as well as at the top to the sealing fitting 43. In a like manner, of course, the sleeve 13 can be threadedly engaged with the sealing fitting 43, though welding or brazing is preferred.

I claim:

1. An improved compression type end fitting for plastic jacketed cables through which fluid mediums pass comprising:
    a. a central body portion having a central bore extending in a longitudinal direction partially therethrough and adapted to receive the end of said cable in order to allow compression of said central body portion about the end of said cable to secure said end fitting to said cable;
    b. a sleeve means surrounding said central body portion and spaced from said body portion at least in contiguous portions extending from a point extending on one end beyond said central body portion and on the other end abutting and sealingly secured to said body portion,
    c. a sealing fitting means positioned at the end of said sleeve means extending beyond said central body portion arranged and constructed to effect a sealing relationship with both the surface of said cable and the sleeve means; and
    d. a passage means positioned in the opposite end of said central body portion from said bore and extending from a location in the central body portion adjacent to which the sleeve means is spaced from said body portion to the terminal end of said end fitting, said passage means opening into the space between the said sleeve and the central body portion at one end and to the exterior of said end fitting at the opposite end and in part defining a portion of a continuous passage extending from a position adjacent an opening in the jacket of a plastic jacketed cable secured in said end fitting — said opening being intermediate the sealing fitting means and the end of the central body portion — longitudinally between the said sleeve means and the said central body portion, and then through the portion of said central body portion beyond the end of said central bore in said central body portion to the end of the fitting, said end fitting being so constructed and arranged that a fluid medium, passing into the upper portion of a plastic jacketed cable, secured in said end fitting, and flowing therethrough along and around the component wires of said cable, will flow from the interior of said cable, through the opening in the plastic jacket, into and through the space between the central body portion and the sleeve means, thence through passage means in the portion of the central body below the end of the central bore therein and therethrough to the exterior of the terminal end of the central body portion which extends beyond the sleeve means.

2. An improved end fitting according to claim 1 wherein the sleeve means is an annular sleeve means and is secured at the end extending beyond the central body portion to the sealing fitting means in which there is positioned a packing means adapted to be compressed against the outer surface of the plastic jacket by a gland means to effect a seal with said plastic jacket.

3. An improved end fitting according to claim 2 wherein the end of the annular sleeve abutting said body portion is threaded and adapted to engage threads upon said body portion to effect a seal therewith.

4. An improved end fitting according to claim 3 additionally comprising packing means adjacent a flange on the body portion against which the annular sleeve means is adapted to be threaded, said packing means effecting a seal between said annular sleeve and said central body portion.

5. An improved end fitting according to claim 4 wherein the end fitting has a threaded nose adapted for threaded engagement with additional apparatus and through which fluid passage means extends to conduct fluid from said fitting to said additional apparatus.

* * * * *